United States Patent
Baluch et al.

(10) Patent No.: US 9,569,183 B2
(45) Date of Patent: Feb. 14, 2017

(54) CONTRACT BASED BUILDER

(71) Applicant: Red Hat, Inc., Raleigh, NC (US)

(72) Inventors: Marek Baluch, Brno (SL); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 51 days.

(21) Appl. No.: 14/631,441

(22) Filed: Feb. 25, 2015

(65) Prior Publication Data

US 2016/0246575 A1 Aug. 25, 2016

(51) Int. Cl.
*G06F 9/44* (2006.01)
*G06F 9/45* (2006.01)

(52) U.S. Cl.
CPC .............. *G06F 8/36* (2013.01); *G06F 8/427* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,961,931 B2 | 11/2005 | Fischer | |
| 7,216,332 B2 | 5/2007 | Smith | |
| 7,395,529 B1 | 7/2008 | Stanton et al. | |
| 7,870,539 B2 | 1/2011 | Wookey | |
| 8,522,207 B1 | 8/2013 | Whittington et al. | |
| 8,825,689 B2 | 9/2014 | Fedorenko et al. | |
| 2003/0005412 A1 | 1/2003 | Eanes | |
| 2005/0120347 A1* | 6/2005 | Asare | G06F 8/61 717/177 |
| 2007/0162903 A1* | 7/2007 | Babb, II | G06F 8/75 717/154 |
| 2007/0180433 A1* | 8/2007 | Ghobrial | G06F 8/4435 717/136 |
| 2008/0184212 A1* | 7/2008 | Lee | G06F 9/45525 717/148 |
| 2008/0295065 A1* | 11/2008 | Hawkins | G06F 8/75 717/103 |
| 2009/0300604 A1* | 12/2009 | Barringer | G06F 11/3664 717/178 |
| 2011/0035726 A1* | 2/2011 | Davies | G06F 8/71 717/110 |

(Continued)

OTHER PUBLICATIONS

Chapter 4—Dependency Management, 2013, http://chimera.labs.oreilly.com/books/1234000001741/ch04.html.

(Continued)

*Primary Examiner* — Insun Kang
(74) *Attorney, Agent, or Firm* — Haynes and Boone, LLP

(57) ABSTRACT

Methods, systems, and computer program products are included for integrating software components. Source code corresponding to the software components is parsed to identify method calls. Method contracts, which contain identifying information corresponding to the method calls, are determined. The method contracts are used to query a dependency data store to identify dependencies that correspond to the method calls. Dependencies that are determined for a component are compared with dependencies for another component in order to identify dependencies that may be used to build the components together, and also to identify conflicting dependencies.

20 Claims, 5 Drawing Sheets

(56) References Cited

U.S. PATENT DOCUMENTS

| | | | | |
|---|---|---|---|---|
| 2011/0202905 A1* | 8/2011 | Mahajan | ............ | G06F 8/43 717/140 |
| 2012/0216179 A1* | 8/2012 | Sharma | ............ | G06F 8/65 717/168 |
| 2013/0007709 A1* | 1/2013 | Fan | ............ | G06F 8/71 717/121 |
| 2014/0068551 A1* | 3/2014 | Balasubramanian | ..... | G06F 8/35 717/107 |
| 2014/0173574 A1* | 6/2014 | Schmidt | ............ | G06F 8/427 717/143 |
| 2015/0143339 A1* | 5/2015 | Rajanna | ............ | G06F 8/43 717/123 |

OTHER PUBLICATIONS

David Soergel, Resolving Software Component Dependencies Using Compatibiity Tests, Jun. 26, 2012, http://davidsoergel.com/posts/resolving-software-component-dependencies-using-compatibility-tests.

How do I tell Maven to Use the Latest Version of a Dependency?, http://stackoverlow.com/questions/30571/how-do-i-tell-maven-to-use-the-latest-version-of-a-dependency, retrived on Jan. 16, 2015.

Mayank Mandloi, Prof. Sachin Patel, Prof. Rakesh Pandit, A Code Reusability Model for Object Oriented Software Design, May 2013, Scholar-M. Tech (IT) Department of IT PCST, Indore India; Head of Dept. IT Department of IT PCST Indore India; Department of IT PCST, Indore India.

* cited by examiner

CONTRACT BASED BUILDER

BACKGROUND

The present disclosure relates generally to building software, and more particularly to methods and systems for integrating software components.

Code reuse (also referred to as software reuse) is the use of existing software components, or software knowledge to build new software. There are many issues with integrating existing software components with new software components. For example, an existing software component may be incompatible with a new software component.

In many instances, incompatibilities between software components are resolved by human intervention, typically by a software developer acting in the role of an integrator. The process of resolving incompatibilities is error prone and complicated. It is desirable to minimize the work required by the integrator and to more efficiently integrate software components.

BRIEF SUMMARY

According to an example, a computer-implemented method includes parsing a first source file to identify a first one or more method contracts corresponding to a first component. The method further includes querying a data store for a first component dependency set corresponding to the first one or more method contracts. The method further includes determining whether a first dependency of the first component dependency set is a member of a second component dependency set. The method further includes adding the first dependency to one of: a minimal dependency set or a conflict dependency set.

According to an example, a non-transitory computer-readable medium includes instructions to parse a first source file of a first component to identify a first one or more method contracts corresponding to the first component; query a data store for a first component dependency set corresponding to the first one or more method contracts; determine whether a first dependency of the first component dependency set is a member of a second component dependency set; and add the first dependency to a minimal dependency set or a conflict dependency set.

According to an example, a system includes a processor and a memory. The system further includes a dependency scanner executed by the processor, the dependency scanner to: parse a first source file of a first component to identify a first one or more method contracts corresponding to the first component; and query a data store for a first component dependency set corresponding to the first one or more method contracts. The system further includes a dependency merge agent communicatively coupled to the dependency scanner, the dependency merge agent to: receive the first component dependency set; determine that a first dependency of the first component dependency set is a member of the second component dependency set; and add the first dependency to a conflict dependency set. The system further includes an update predictor communicatively coupled to the dependency merge agent, the update predictor to: receive the conflict dependency set; and analyze the conflict dependency set to identify a number of unmatched method calls corresponding to each dependency in the conflict dependency set.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
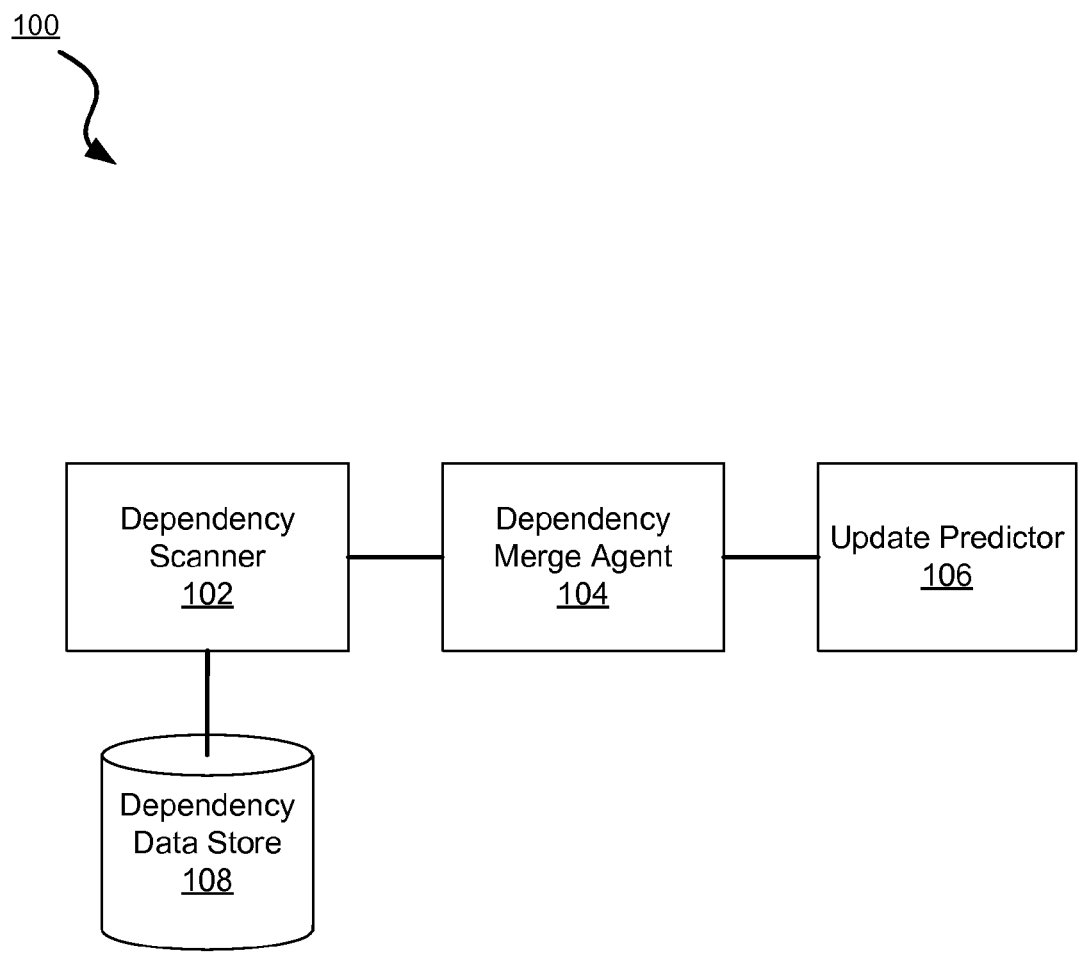
FIG. 1 is a block diagram illustrating a system architecture for integrating software components, in accordance with various examples of the present disclosure.

FIG. 1 illustrates a system architecture 100 for integrating software components in which examples of the present disclosure can be implemented.

System architecture 100 includes software modules (e.g., dependency scanner 102, dependency merge agent 104, update predictor 106) and data stores (e.g., dependency data store 108). The software modules are executed by one or more machines that individually or jointly execute a set (or multiple sets) of instructions to perform any one or more of the methodologies discussed herein. Examples of machines include enterprise servers, personal computers (PCs), and any other machines capable of executing a set of instructions (sequential or otherwise). In some examples, software modules and data stores may be structured on a single machine. In other examples, software modules and data stores may be structured on a plurality of machines that are communicatively coupled, such as via a network.

In some examples, the software modules are structured as one or more applications that are executed by an operating system running on a machine. The operating system may be any standard or proprietary operating system. One or more users, such as software developers may access the machine, either locally or remotely, in order to interact with the machine and cause the software modules to execute. In other examples, the software modules are executed without active human interaction.

In the present example, the dependency data store 108 is a repository or other listing that serves as a catalog of available dependencies. In the present example, dependencies are libraries that include methods. The methods may be accessed, for example by a method call that is implemented in source code. Source code that includes a call to a method in a dependency is reliant upon the dependency during a build of the source code. In some examples, dependency data store 108 is a database that includes fields that store metadata corresponding to dependencies. In other examples, dependency data store 108 is a directory on a computer-readable storage medium that is identified as storing dependencies. The directory may be identified by a "class path" variable, which identifies the location of the dependencies to a compiler and/or other software build tools. Dependency data store 108 may be queried or browsed for information regarding the dependencies.

In the present example, dependency scanner 102 is structured to input one or more source code files corresponding to a first software component and one or more source code files corresponding to a second software component. In the present example, the first software component and the second software component are the software components that result from building the source code files corresponding to the first software component and the second software component, respectively. The dependency scanner 102 is structured to parse and analyze source code files that are input into the dependency scanner 102. The dependency scanner 102 is structured to query the dependency data store 108 for dependency information corresponding to the source code files. The dependency scanner 102 is structured to match between method information parsed from source code files and the dependency information queried from the data store 108 in order to determine a set of dependencies corresponding to the first software component and a set of dependencies corresponding to the second software component. The dependency scanner 102 is communicatively coupled to the dependency merge agent 104 and may output the dependency sets to the dependency merge agent 104.

In the present example, the dependency merge agent 104 is structured to receive the dependency sets from the dependency scanner 102. The dependency merge agent 104 is structured to analyze the dependency sets in order to determine dependencies that may be used to perform a build that integrates the first software component and the second software component. The dependency merge agent 104 is also structured to identify conflicting dependencies, which would cause errors when building the first software component and the second software component together.

The dependency merge agent 104 is communicatively coupled to an update predictor 106. In the event that conflicting dependencies are identified, the dependency merge agent 104 is structured to output an identification of the conflicting dependencies to the update predictor 106. In the event that no conflicting dependencies are identified, the dependency merge agent 104 is structured to output an identification of dependencies that do not conflict to one or more build scripts, which may be used to automate the integration and building of the first software component and the second software component.

In the present example, the update predictor 106 is structured to receive a set containing identifications of the conflicting dependencies from the dependency merge agent 104. The update predictor 106 is structured to analyze the conflicting dependencies to determine the dependencies from the conflicting dependency set that require the fewest number of source code updates in order to build the first software component with the second software component. The update predictor 106 is structured to output the identification of the dependencies that require the fewest number of source code updates, such as by displaying a listing of the dependencies to a software developer. The listing may be used to advise the software developer as to which dependencies are efficient to call from the source code of the first software component and the second software component.

Figure 2:
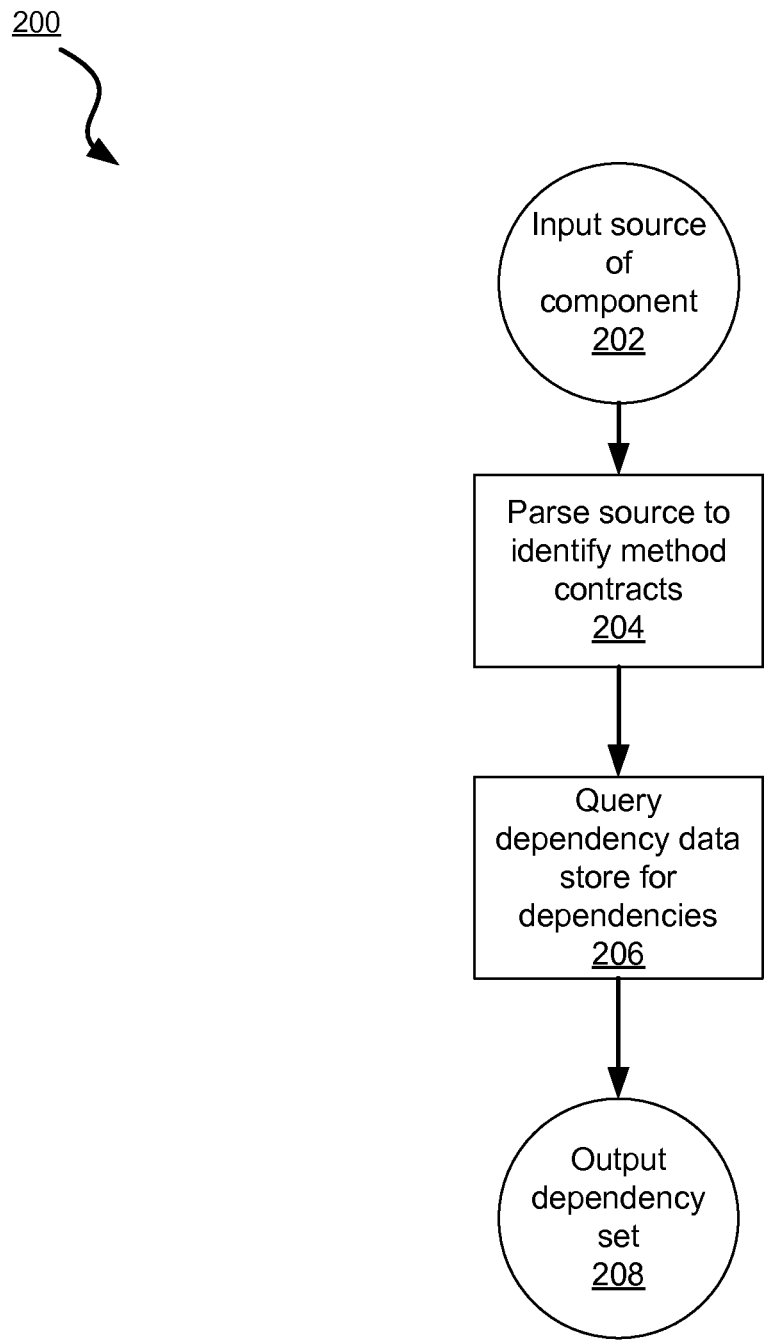
FIG. 2 is a flow diagram illustrating a method performed by a dependency scanner, in accordance with various examples of the present disclosure.

FIG. 2 is a flow diagram illustrating a method performed by a dependency scanner, according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. The method may be performed for software components in serial or in parallel.

The method 200 may be performed by a software module referred to as a dependency scanner. In the present example, there are two software components that a software developer is integrating. In order to determine the dependencies required for each of the components, the source code of the first component is input into the dependency scanner to determine and output the dependencies of the first component. Next, the source code of the second component is input into the dependency scanner to determine and output the dependencies of the second component. The below steps illustrate a dependency scanning corresponding to the first component. The dependency scanning corresponding to the second component is performed in a similar manner. In yet other examples, source code for a plurality of components may be input and processed either sequentially or in parallel.

At block 202, source code of the first component is input into the dependency scanner. In the present example, the source code is input from a single source code file. In other examples, the source code is input from plurality of source code files.

At block 204, the source code is parsed to obtain method contracts. Each method contract is composed of a class identifier and a method identifier. The class identifier is composed of a package name and a class name. The method identifier is composed of a method name and parameters of the method. Parameters include the types of both the input and output parameters. In some examples, the method contract, class identifier, and method identifier are represented in tuple format. For example, a method contract may be structured in the following form:

(packagename.classname).method(method_parameters)).

In the present example, the method contracts are identified by parsing the source code line-by-line. The parsing may first identify a method call in a line of the source code. Based on the method call, the class identifier and the method identifier may then be determined. In other examples, the parsing may first identify a class identifier. Based on the class identifier the method call corresponding to the class identifier may be determined, and the method identifier of the method call may be determined.

The parsing of the lines of source code may be performed using a brute-force algorithm that reads in characters on each line and performs a matching between the characters and pre-configured strings. Pre-configured rules may be used to identify special characters, such as periods, semi-colons, parenthesis, and so forth, based on the type of source code that is being parsed.

For example, a rule may identify that "." is a delimiter that separates a class name and a method name. In other example, a line beginning with the "import" string may be identified as containing a package name and a class name.

For example, a Java source code file may include the following text:

import java.package.firstClass.*;

In this example, the parser may match the "import" string to a pre-configured rule that identifies the string following the "import" string as a class identifier that includes both the package name and the class name. Accordingly, the parser uses the rule to identify "java.package.firstClass" as the class identifier, with "java.package" being the identified package name and "firstClass" being the identified class name.

In this example, the parser may then attempt to identify the creation of an instance of the class. For example, the Java source code file may include the following text:

```
myFirstClass = new firstClass;
Int x, y;
x = myFirstClass.callFirstMethod (y);
```

In this example, the parser may match the firstClass class identifier with the myFirstClass instance. Accordingly, the parser is able to identify method calls on the class instance by identifying the period in the "myFirstClass.callFirstMethod" string as signifying that the class instance is followed by a method call. The method name is identified as "callFirstMethod." The parser identifies the x and the y parameters in the line that contains the method call. Based on parsing the source code, the line above the method call is identified as the line where the parameter types for x and y are defined. Based on the "Int x, y" declaration, the parser matches the string "Int" to a rule and based on the rule identifies x and y as being of the type "int." The "callFirstMethod" method is therefore identified as having an input parameter of type "int" and an output parameter of type "int."

The method contract corresponding to the method call is composed of the parsed class identifier and method identifier. In this example, the class identifier is determined to be "java.package.firstClass." The method identifier is determined to have the method name "callFirstMethod" with one input parameter that is of type "int" and one output parameter of type "int." Accordingly, the determined method contract for the myFirstClass.callFirstMethod (y) method call in this example is: (java.package.firstClass).callFirstMethod(input: int; output:int)).

In the present example, the parsing continues for each of the method calls, in order to attempt to determine a method contract corresponding to each method call. Each method contract may be fully identified (e.g., the parser has identified all of the class identifier and method identifier) or partially identified (e.g., the parser has identified some, but not all, of the class identifier and/or method identifier).

At block 206, the method contracts from the parser are input into queries of the dependency data store. In the present example, the dependencies are JAR files, which each contain a library. Each library comprises a plurality of methods that may be called from the source code. In the present example, the dependency data store identifies the dependencies and metadata corresponding to the dependencies. The metadata and dependencies themselves may be queried. In some examples, the metadata for each dependency includes a library name, a version, a vendor identifier, methods contained in the library, and parameters type information corresponding to each of the methods (including both input and return parameter types).

In the present example, the queries of the dependency data store are used to match between input method contract information and dependency information from the dependency data store. In some examples, matches may be determined based on a total match between an method contract and a dependency. In other examples, matches that exceed a pre-configured threshold of similarity are determined to be a match. For example, the (java.package.firstClass).callFirstMethod(input: int; output:int)) method contract may be determined to be a match with versions one and two of a library called "firstClass" based on the "firstClass" libraries versions one and two including a method named "callFirstMethod" that has an input that is of type "int" and an output of type "int." For example, version three of the "firstClass" library may be determined to not be a match, if version three requires a different number of inputs for the method, requires an input of a different type, or has a different output type.

Based on the matching between the method contracts and the dependencies, a set of dependencies is identified that correspond to the method contracts of the source code. The matching for each method contract may identify a plurality of dependencies as matching the method contract, as shown in the above example, where there are a plurality of versions of a dependency that match the method contract. All of the matching dependencies may be added to the dependency set corresponding to the first component.

At block 208, the dependency set is output. The output may also include a component identifier to which the dependency set corresponds. For example, if the source code that was input corresponds to "component one" then the dependency set that is output may be associated with the identifier "component one." In some examples, the output is structured as a tuple. For example, the output may be (component identifier, dependency set). In the present example, after completing the dependency scanning of the first component, dependency scanning is performed for a second component. The dependency sets for both components may then be input into a dependency merge agent.

Figure 3:
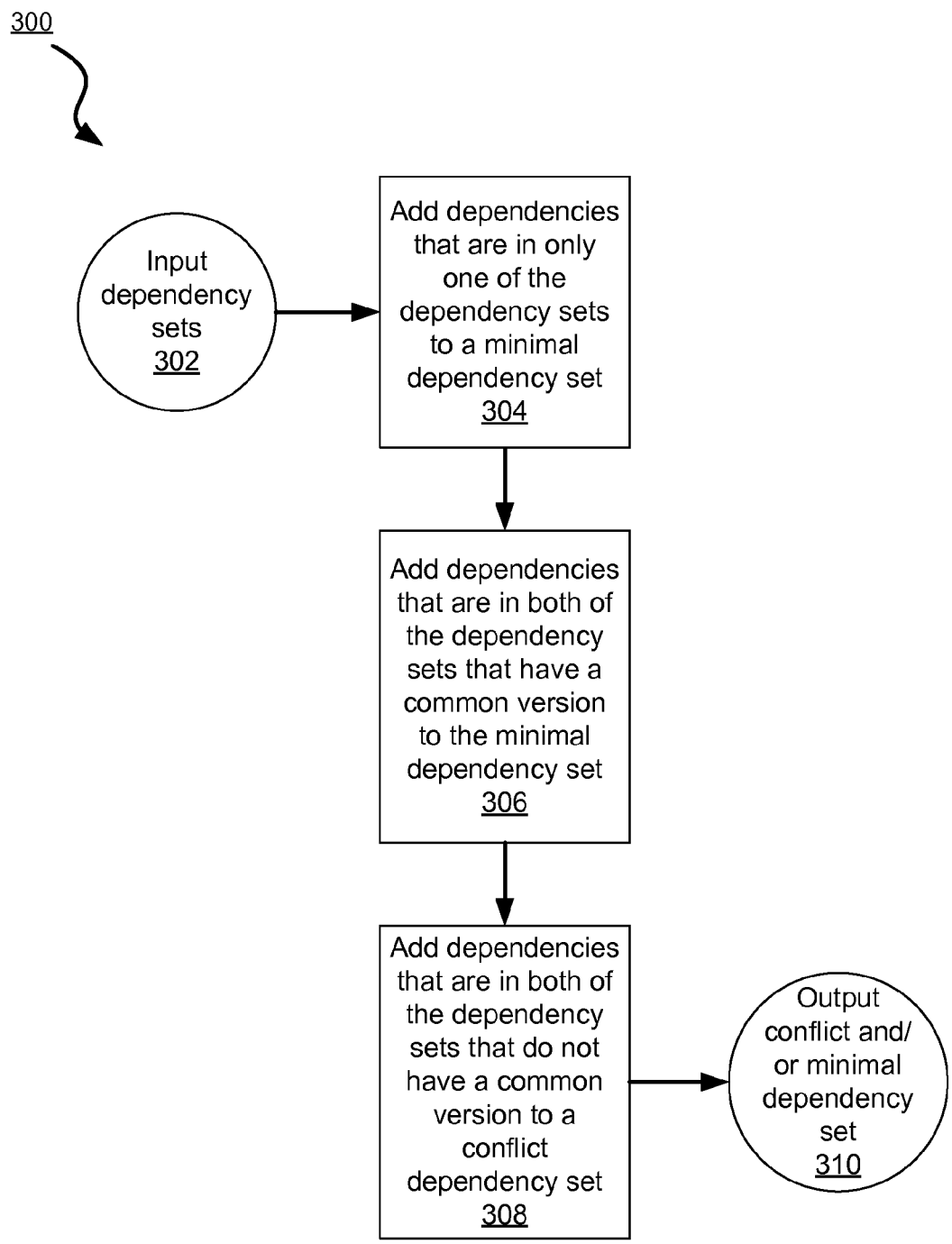
FIG. 3 is a flow diagram illustrating a method performed by a dependency merge agent, in accordance with various examples of the present disclosure.

FIG. 3 is a flow diagram illustrating a method performed by a dependency merge agent, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 302, dependency sets corresponding to components to be integrated are input into a dependency merge agent. In the present example, the output tuples from a dependency scanner for two components are input into the dependency merge agent at block 302. For example, a dependency scanner may have the output of (first component, first dependency set) for a first component and an output of (second component, second dependency set) for a second component. In the present example, the input at block 302 is the first dependency set and the second dependency set.

At block 304, the dependency sets are analyzed to identify dependencies that are in one of the dependency sets, but not both dependency sets. This may be determined by performing an intersection of the dependency sets and comparing dependencies with the dependencies in the intersection set.

The dependencies that are determined to be in only one dependency set are added to a minimal dependency set. For example, the first dependency set may include two dependencies: java.package.Math (version 1) and java.package.Math (version 2). The second dependency set may include java.package.String (version 1). In this example, there is no overlap between any of the components. Therefore, java.package.Math (version 1), java.package.Math (version 2) and java.package.String (version 1) are available for inclusion into the minimal dependency set.

In another example that incorporates an optimization, where there are different versions of the same dependency in the dependency set of a component that are not in the dependency set for the other component, only the newest version of the dependency is selected for inclusion into the minimal dependency set. So, in reference to the same dependencies as in the previous example, java.package.Math (version 2) and java.package.String (version 1) are added to the minimal dependency set. In this example, java.package.Math (version 1) would not be added to the minimal dependency set as there is a newer version, java.package.Math (version 2) from the first dependency set that is added to the minimal dependency set.

At block 306, the dependency sets are analyzed to identify dependencies that are in both dependency sets. This may be performed by determining an intersection of the dependency sets. The dependencies that are in both dependency sets may be referred to as "common dependencies" or "intersecting dependencies." The versions of the dependencies in the intersecting dependencies are analyzed to determine whether there is also a version intersection.

For example, the first dependency set includes two dependencies: java.package.Math (version 1) and java.package.Math (version 2). The second dependency set includes two dependencies: java.package.Math (version 2) and java.package.Math (version 3). The components both have the java.package.Math (version 2) dependency in common. Accordingly, java.package.Math (version 2) is added to the minimal dependency set. Where there are a plurality of common versions the newest version may be added rather than all of the common versions.

At block 308, the dependencies that were identified in block 306 as being in both dependency sets that do not have a version in common are added to a conflict dependency set. For example, the dependency set for a first component includes two dependencies: java.package.Graphics (version 1) and java.package.Graphics (version 2). The dependency set for a second component includes one dependency: java.package.Graphics (version 3). The components both have the java.package.Graphics dependency in common. However, there is not a shared version of the dependency. Where there are a plurality of versions of a dependency in a dependency set and none of the versions are in common between the two dependency sets, the highest version of the dependency in the dependency set is selected for inclusion into the conflict dependency set. Accordingly, for the first dependency set in this example, java.package.Graphics (version 2) is selected into the conflict dependency set. For the second dependency set in this example, java.package.Graphics (version 3) is selected into the conflict dependency set.

At block 310, in the present example, if the conflict dependency set is empty, then the minimal dependency set is output to an automated build script module in order to create a build script for the components using the dependencies identified in the minimal dependency set. The components may then be integrated using the identified dependencies.

If the conflict dependency set is not empty, an error may be raised, and the conflict dependency set is output to an update predictor module, which further analyzes the conflict dependency set in order to determine advisory information regarding how to most efficiently integrate the components.

Figure 4:
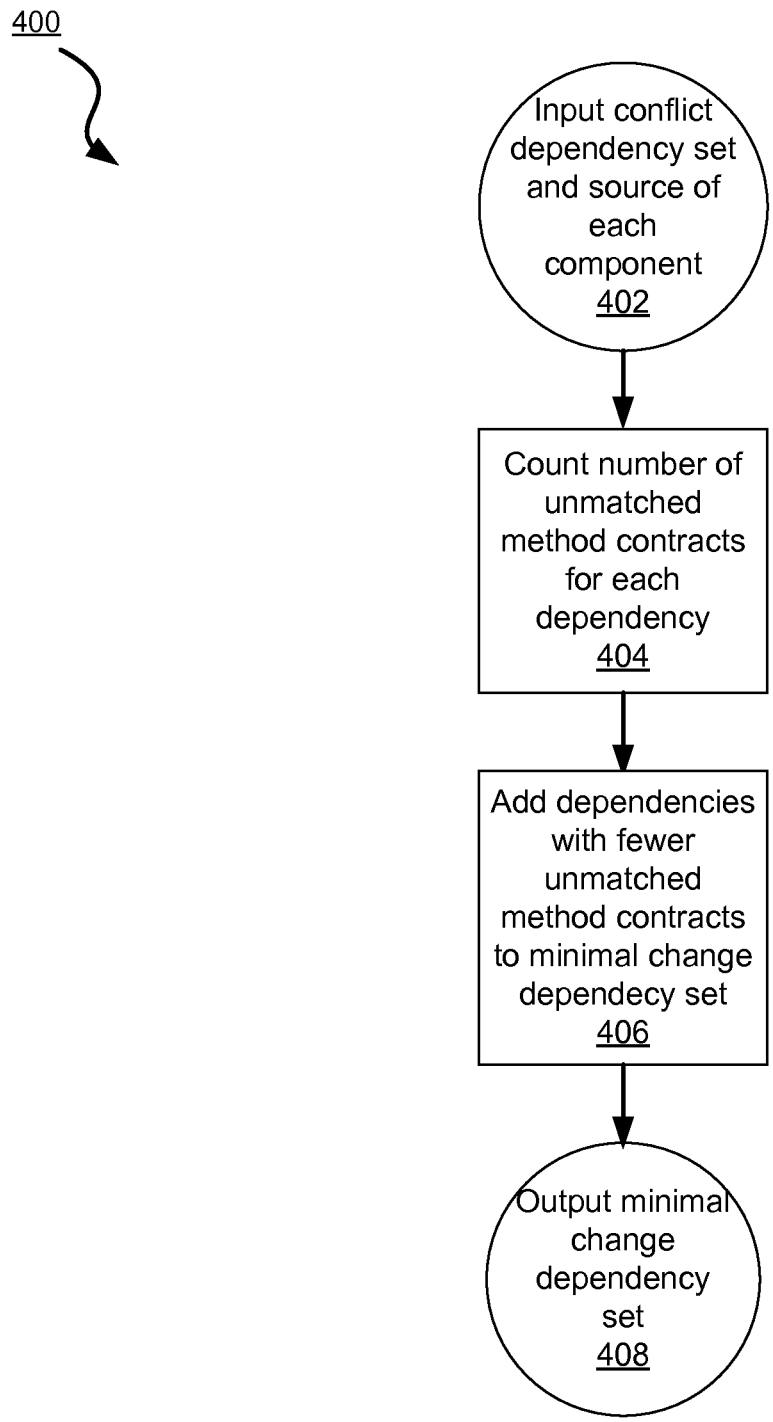
FIG. 4 is a flow diagram illustrating a method performed by an update predictor, in accordance with various examples of the present disclosure.

FIG. 4 is a flow diagram illustrating a method performed by an update predictor, according to some examples of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

The update predictor is used to process a conflict dependency set in order to provide information to a software developer that will allow the software developer to modify the source code and resolve conflicts caused by conflicting dependencies. For example, there may be two dependencies that conflict. The update predictor may be used to analyze the source code with respect to the two dependencies and provide the user with the identification of the dependency (of the two conflicting dependencies) that should be used in order to result in the fewest number of changes to the source code. This information allows the software developer to efficiently make determinations regarding dependencies to select and dependencies to omit. Further, the update predictor may identify the lines of code that the software developer will need to update in order to use a particular dependency. The below steps illustrates a method performed by the update predictor to identify the dependencies that will result in the fewest number of changes to the source code. In some examples, the number of changes refers to a number of lines of code to update in order to use a particular dependency. In other examples, the number of changes refers to a number of method calls to update in order to use a particular dependency.

At block 402, a conflict dependency set corresponding to two components is input into an update predictor. The conflict dependency set identifies the dependencies of two components that conflict. For example, a first component may use a first version of a dependency, and a second component may use a second version of the dependency that is incompatible with the first version. The source code of the two components is also input into the update predictor. The source code of the two components is referred to as the "combined source code" of the two components. In the present example, the conflict dependency set is input from the output of a dependency merge agent, which was used to identify the conflicting dependencies.

At block 404, the combined source code of the two components is parsed to determine a number of method calls in the combined source code that do not correspond to each dependency in the conflict dependency set. This may be performed by first parsing the combined source code to identify the method calls and then determining the method contracts corresponding to the method calls. In some examples, the parsing of the source code to identify method contracts is a line by line parsing to identify a method call, in a manner similar or the same as the method performed by the dependency scanner to determine method contracts corresponding to method calls. In other examples, method contracts corresponding to the method calls identified in previous parsing steps (e.g., such as by a dependency scanner) may have been stored, such that the method contracts may be identified without performing the parsing a second time.

In the present example, each method contract corresponding to each method call is matched with each dependency in the conflict dependency set. This may be performed by matching between data from the method contract corresponding to the method call and the dependency (and/or metadata corresponding to the dependency that is stored in a dependency data store). The matching may be performed in a similar manner as the matching between method contracts and dependencies as performed by a dependency scanner.

Each dependency is associated with an unmatched method call counter, which stores a number of method calls in the combined source code that have method contracts that are not matches with the dependency. The method contract of each method call is compared with each dependency in the conflict dependency set, and the unmatched method call counter corresponding to each dependency is incremented for each non-matching method contract.

For example, java.package.Math (version 2) may be a first dependency in the conflict dependency set, and java.package.Math (version 3) may be a second dependency in the conflict dependency set. In this example, the parsing identified that there are five method calls in the combined source code that are not supported by java.package.Math (version 2). Accordingly, the unmatched method contract counter associated with the java.package.Math (version 2) dependency is set to five. In this example, the parsing identified that there are three method calls in the combined source code that are not supported by java.package.Math (version 3). Accordingly, the unmatched method contract counter associated with the java.package.Math (version 3) dependency is set to three.

At block 406, the number of unmatched method contracts of the dependencies in the conflict dependency set are compared in order to determine which of the conflicting dependencies have a lower number of unmatched method contracts. As per the previous example, java.package.Math (version 3) is identified as having fewer unmatched method contracts since there are only three method calls that are not supported by java.package.Math (version 3) as opposed to there being five method calls that are not supported by java.package.Math (version 2). Accordingly, java.package.Math (version 3) is added to a minimal change dependency set, and java.package.Math (version 2) is not added to the minimal change dependency set.

At block 408, the minimal change dependency set is output. In some examples, the minimal change dependency set is displayed to a user, so that the user may determine which dependencies require fewer method call modifications in the source code compared to other dependencies. Generally, each method call corresponds to a line of code. Accordingly, the unmatched method contracts counters provide an indication of the number of lines of code that would need to be updated in order to integrate two components using a particular dependency. A software developer may choose to modify method calls in the source code to depend upon a dependency that is identified as requiring the fewest number of updates to the source code.

Figure 5:
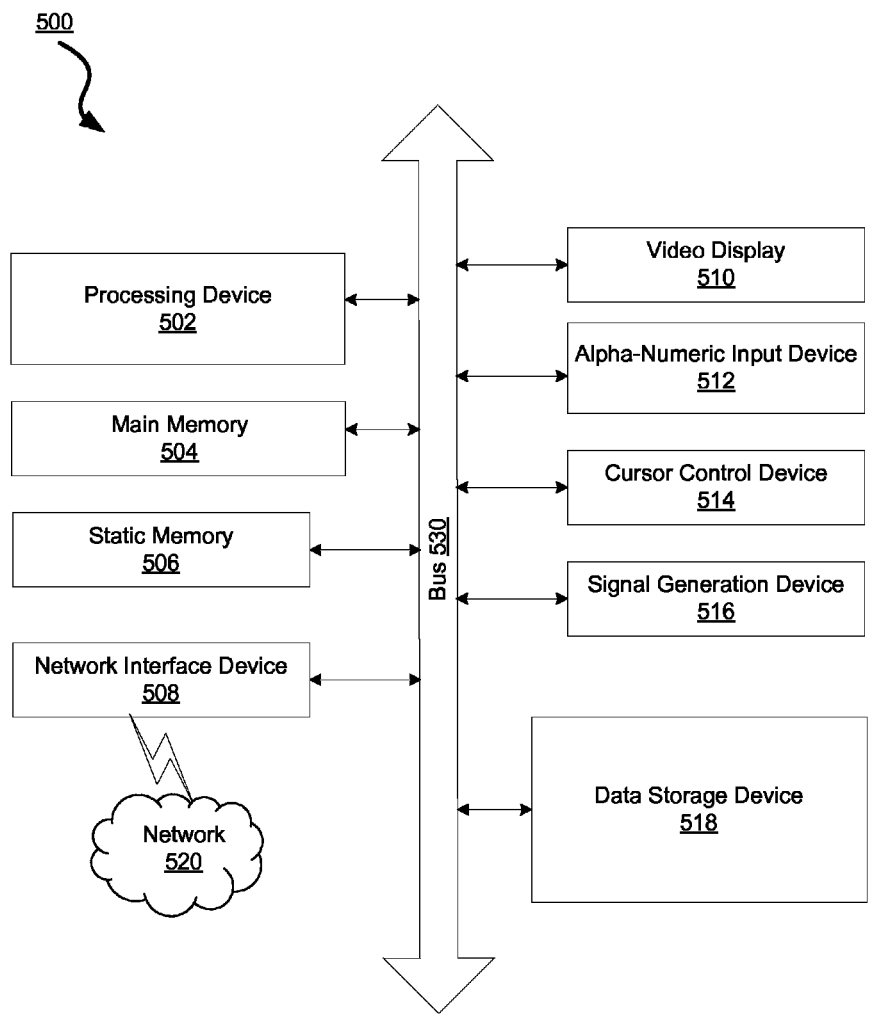
FIG. 5 is a block diagram illustrating a computer system that may perform one or more of the operations described herein.

FIG. 5 illustrates a diagram of a machine in the form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for integrating software components, the method comprising;
   parsing a first source file to identify a first one or more method contracts corresponding to a first component;
   querying a data store for a first component dependency set corresponding to the first one or more method contracts;
   parsing a second source file to identify a second one or more method contracts corresponding to a second component;
   querying the data store for a second component dependency set corresponding to the second one or more method contracts;
   determining whether a first dependency of the first component dependency set is a member of the second component dependency set;
   based at least in part on the determining, adding the first dependency of the first component dependency set to a minimal dependency set or a conflict dependency set;
   parsing the first source file and the second source file to identify a first number of method calls that do not correspond to a first dependency of the conflict dependency set;
   parsing the first source file and the second source file to identify a second number of method calls that do not correspond to a second dependency of the conflict dependency set, wherein the second number is less than the first number; and
   outputting a minimal change dependency set, wherein the second dependency of the conflict dependency set is a member of the minimal change dependency set, and wherein the first dependency of the conflict dependency set is not a member of the minimal change dependency set.

2. The method of claim 1, wherein a method contract of the first one or more method contracts or the second one or more method contracts comprises a method identifier and a class identifier.

3. The method of claim 2, wherein the method identifier comprises a method name and one or more parameters corresponding to the method name, and wherein the one or more parameters comprise one or more input parameter types and at least one return parameter type.

4. The method of claim 2, wherein the class identifier comprises a package name and a class name.

5. The method of claim 1, wherein the first component dependency set comprises one or more library identifiers, wherein the one or more library identifiers correspond to libraries that contain at least one method corresponding to the first one or more method contracts.

6. The method of claim 1, wherein the minimal dependency set comprises a dependency that is a member of only one of the first component dependency set or the second component dependency set.

7. The method of claim 1, wherein the minimal dependency set comprises a dependency that is a member of the first component dependency set and the second component dependency set, and wherein the dependency has a same version in the first component dependency set and the second component dependency set.

8. The method of claim 1, wherein the conflict dependency set comprises a dependency that is a member of the first component dependency set and the second component dependency set, and wherein the dependency does not have a same version in both the first component dependency set and the second component dependency set.

9. A non-transitory computer-readable medium for integrating software components, the non-transitory computer readable medium comprising computer-readable instructions executable by one or more processors to cause the one or more processors to:
   parse a first source file of a first component to identify a first one or more method contracts corresponding to the first component;
   query a data store for a first component dependency set corresponding to the first one or more method contracts;

determine whether a first dependency of the first component dependency set is a member of a second component dependency set;
add the first dependency of the first component dependency set to a minimal dependency set or a conflict dependency set;
parse at least the first source file to count a first number of method calls that do not correspond to a first dependency of the conflict dependency set;
parse at least the first source file to count a second number of method calls that do not correspond to a second dependency of the conflict dependency set, wherein the second number is less than the first number; and
output a minimal change dependency set, wherein the minimal change dependency set includes the second dependency of the conflict dependency set, and wherein the minimal change dependency set does not include the first dependency of the conflict dependency set.

10. The non-transitory computer-readable medium of claim 9, the computer-readable instructions further executable to:
determine whether the first dependency of the first component dependency set has a same library name and version number as a dependency in the second component dependency set.

11. The non-transitory computer-readable medium of claim 10, the computer-readable instructions further executable to:
based on the first dependency of the first component dependency set having the same library name and version number as the dependency in the second component dependency set, adding the first dependency of the first component dependency set to the minimal change dependency set.

12. The non-transitory computer-readable medium of claim 10, the computer-readable instructions further executable to:
add the first dependency of the first component dependency set to the conflict dependency set, wherein the first dependency of the first component dependency set has a same library name as the dependency in the second component dependency set, and wherein the first dependency of the first component dependency set has a different version number than the dependency in the second component dependency set.

13. The non-transitory computer-readable medium of claim 9, wherein a method contract of the first one or more method contracts comprises a method identifier and a class identifier.

14. The non-transitory computer-readable medium of claim 13, wherein the method identifier comprises a method name and one or more parameters corresponding to the method name, and wherein the class identifier comprises a package name and a class name.

15. A software integration system comprising:
one or more hardware processors and at least one memory;
a dependency scanner executed by the one or more hardware processors, the dependency scanner to:
parse a first source file of a first component to identify a first one or more method contracts corresponding to the first component; and
query a data store for a first component dependency set corresponding to the first one or more method contracts;
a dependency merge agent communicatively coupled to the dependency scanner, the dependency merge agent to:
receive the first component dependency set;
determine that a first dependency of the first component dependency set is a member of a second component dependency set; and
add the first dependency of the first component dependency set to a conflict dependency set; and
an update predictor communicatively coupled to the dependency merge agent, the update predictor to:
receive the conflict dependency set;
parse the first source file to count a first amount of method calls that do not correspond to a first dependency of the conflict dependency set;
parse the first source file to count a second amount of method calls that do not correspond to a second dependency of the conflict dependency set; and
determine a minimal change dependency set that includes the second dependency of the conflict dependency set and does not include the first dependency of the conflict dependency set.

16. The software integration system of claim 15, wherein a method contract of the first one or more method contracts comprises a method identifier and a class identifier.

17. The software integration system of claim 16, wherein the method identifier comprises a method name and one or more parameters corresponding to the method name, and wherein the one or more parameters comprise one or more input parameter types and at least one return parameter type.

18. The software integration system of claim 16, wherein the class identifier comprises a package name and a class name.

19. The software integration system of claim 15, wherein the first component dependency set comprises one or more library identifiers, and wherein each of the one or more library identifiers corresponds to a library that contains at least one method corresponding to the first one or more method contracts.

20. The software integration system of claim 15, wherein a first number of unmatched method calls is compared to a second number of unmatched method calls, and based on the comparison, information corresponding to the first dependency of the first component dependency set is output via a user interface.

* * * * *